(12) United States Patent
Maguire et al.

(10) Patent No.: US 10,364,100 B2
(45) Date of Patent: Jul. 30, 2019

(54) HEAT RESISTANT CONVEYOR BELT

(71) Applicant: ContiTech Transportbandsysteme GmbH, Hannover (DE)

(72) Inventors: David J. Maguire, Hudson, OH (US); Thomas George Burrowes, North Canton, OH (US); Guangzhuo Rong, Hudson, OH (US); Sebastian Seibold, Hannoversch Muenden (DE); Heng-Huey Yang, Copley, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 15/781,154

(22) PCT Filed: Dec. 9, 2016

(86) PCT No.: PCT/US2016/065749
§ 371 (c)(1),
(2) Date: Jun. 4, 2018

(87) PCT Pub. No.: WO2017/100523
PCT Pub. Date: Jun. 15, 2017

(65) Prior Publication Data
US 2018/0346250 A1    Dec. 6, 2018

Related U.S. Application Data

(60) Provisional application No. 62/265,558, filed on Dec. 10, 2015.

(51) Int. Cl.
*B65G 15/36*    (2006.01)
*B65G 15/38*    (2006.01)
(Continued)

(52) U.S. Cl.
CPC ............. *B65G 15/36* (2013.01); *B65G 15/38* (2013.01); *B32B 25/042* (2013.01); *B32B 25/10* (2013.01);
(Continued)

(58) Field of Classification Search
None
See application file for complete search history.

(56) References Cited

U.S. PATENT DOCUMENTS

| 7,338,574 B2 * | 3/2008 | Spohn | .................... B29C 41/32 156/246 |
|---|---|---|---|
| 2002/0036129 A1 | 3/2002 | Breed et al. | |
| 2012/0168285 A1 | 7/2012 | Holland | |

FOREIGN PATENT DOCUMENTS

| AU | 2013258262 A1 | 12/2014 |
|---|---|---|
| CN | 200957970 Y | 10/2007 |

(Continued)

*Primary Examiner* — Kavel Singh
(74) *Attorney, Agent, or Firm* — David L. Cate

(57) ABSTRACT

Heavy duty conveyor belts (1) having excellent resistance to high temperatures. These conveyor belts (1) can be repeatedly exposed to temperatures of greater than 200° C. or even 250° C. without compromising the strength or reliability of the belt while providing a greatly extended service life. The conveyor belts (1) may also be manufactured in a commercially viable and cost effective manner. The conveyor belts (1) generally include a reinforcement layer (3), a carry cover layer (2) disposed above the reinforcement layer (3), a pulley cover layer (4) disposed beneath the reinforcement layer (3), and the carry cover layer (2) is comprised of a fluoroelastomer. In some aspects, the conveyor belts (1) have a carry cover layer (2) which includes an outer surface layer (6) containing a fluoroelastomer and an inner layer (7) based upon an EPM elastomer or an EPDM elastomer.

24 Claims, 3 Drawing Sheets

(51) Int. Cl.
  *B65G 15/32*   (2006.01)
  *B65G 15/30*   (2006.01)
  *B32B 25/04*   (2006.01)
  *B32B 25/10*   (2006.01)
  *B32B 25/14*   (2006.01)

(52) U.S. Cl.
  CPC ......... *B32B 25/14* (2013.01); *B32B 2250/248* (2013.01); *B32B 2307/304* (2013.01); *B32B 2433/02* (2013.01)

(56) References Cited

FOREIGN PATENT DOCUMENTS

| | | |
|---|---:|---|
| EP | 0719718 A2 | 7/1996 |
| EP | 1721842 A1 | 11/2006 |
| JP | 2006062141 A | 3/2006 |

\* cited by examiner

HEAT RESISTANT CONVEYOR BELT

RELATED APPLICATION INFORMATION

This Patent Application claims priority to U.S. Provisional Patent Application No. 62/265,558 filed Dec. 10, 2015, and Patent Cooperation Treaty (PCT) Patent Application No. PCT/US2016/065749, filed Dec. 9, 2016, the disclosures of which are incorporated herein in their entirety, by reference.

FIELD

The field to which the disclosure generally relates is conveyor belts having enhanced resistance to high temperatures. More specifically this disclosure relates to conveyor belts for the transportation of hot materials, such as hot cement and hot metals, at temperatures in excess of 200 deg C. (° C.).

BACKGROUND

This section provides background information to facilitate a better understanding of the various aspects of the disclosure. It should be understood that the statements in this section of this document are to be read in this light, and not as admissions of prior art.

Conveyor belts are commonly utilized in a wide variety of commercial applications for the purpose of transporting products and materials. Such conveyor belts can serve in applications which have minimal demands, moderate demands, or in applications which are extremely demanding and which require heavy-duty conveyor belts for carrying heavy loads under adverse conditions, such as exposure to high temperatures. Conveyor belts can also very greatly in size and length. For instance, the conveyor belts used in mining applications can be very wide, for example over three meters wide, and very long, in some cases, on the order of many kilometers. They can also be up to about 7 centimeters thick or even thicker. In any case, heavy-duty conveyor belts are widely used for moving minerals, coal, cement, hot metal products, and a wide variety of manufactured products from one point to another. For instance, heavy-duty conveyor belts are often used in typical mining applications to transport minerals below the ground, to above the surface, and ultimately above ground to a desired location for processing and/or ultimately for transportation on rail road cars, trucks, barges, or ships. Heavy duty conveyor belts are also commonly used for moving hot cement from one location to another in cement plants and for transporting hot iron ore and metal alloys from blast furnaces. These are extremely demanding applications due to the heavy loads and extremely hot temperatures that are typically encountered.

Conventional conveyor belts which are used heavy duty applications where high temperatures can be encountered are typically comprised of a cured rubber as a top layer (the carry cover layer), a cured rubber as a bottom layer (the pulley cover layer), and a reinforcement layer which is situated between the top layer and the bottom layer. The prominent material used in such conveyor belts generally is a moderately flexible elastomeric or rubber-like material, such as an ethylene-propylene-diene monomer rubber (EPDM), and the belt is typically reinforced by a plurality of longitudinally extending steel cables or cords which are positioned within the belt and extend along the length thereof.

All conveyor belts are, of course, susceptible to normal wear and tear as well as damage from the material being transported and/or harsh environmental conditions. Over the years, substantial improvements have been made in the wear resistance of the rubber used as the cover carry layer of the conveyor belts and the useful service life of conveyor belts has been extended. However, conveyor belts which are routinely exposed to high temperatures generally have a shortened service life. Accordingly, there is a long felt need for a heavy duty conveyor which can be repeatedly or even continuously exposed to high temperatures while providing a longer service life without compromising the strength or reliability of the belt. Accomplishing these objectives has proven to be elusive and there continues to be a need for such a high temperature resistant conveyor belt which can withstand temperatures of greater than 200 deg C., or even 250 deg C. The need for such a high temperature resistant conveyor belt which can be manufactured in a commercially viable and cost effective manner remains today.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some aspects of the disclosure are conveyor belts having a reinforcement layer, an upper carry cover layer above the reinforcement layer, and a pulley cover layer beneath the reinforcement layer, where the carry cover layer is comprised of a fluoroelastomer. In some aspects of the disclosure, the carry cover layer includes an outer surface layer which is comprised of the fluoroelastomer and an inner layer which is comprised of an EPM elastomer, an EPDM elastomer, or combination thereof. The outer surface layer may have a thickness of from about 0.5 mm to about 4 mm, or even from about 1 mm to about 2 mm.

In some aspects, the fluoroelastomer has a fluorine content which is within the range of 64 weight percent to 71 weight percent. The fluoroelastomer may have repeat units which are comprised of at least two perfluorinated monomers and at least one cure site monomer, and in such cases, the fluoroelastomer may have repeat units which are comprised of a perfluoroolefin monomer, a perfluorovinyl ether monomer, and a cure site monomer. The perfluoroolefin monomer may be selected from the group consisting of vinylidene fluoride, hexafluoropropylene, and tetrafluoroethylene. Where used, the perfluorovinyl ether monomer may be selected from the group consisting of perfluoro (methyl vinyl) ether and perfluoro(propyl vinyl) ether repeat units. The cure site monomer may be selected from the group consisting of nitrile-containing fluorinated olefin monomers, nitrile-containing fluorinated vinyl ether monomers, fluorinated olefin monomers, brominated α-olefin monomers, and iodinated α-olefin monomers.

In some aspects, the perfluoroolefin monomer is present in the fluoroelastomer at a level which is within the range of 20 weight percent to 80 weight percent, where the perfluorovinyl ether monomer is present in the fluoroelastomer at a level which is within the range of 20 weight percent to 80 weight percent, and where the cure site monomer is present in the fluoroelastomer at a level which is within the range of 0.1 weight percent to 5 weight percent. The cure site monomer may be present in the fluoroelastomer at a level which is within the range of 0.2 weight percent to 2 weight percent, or even within the range of 0.3 weight percent to 1 weight percent.

In some other aspects of the disclosure, conveyor belts include a reinforcement layer, an upper carry cover layer disposed above the reinforcement layer, and a pulley cover layer disposed beneath the reinforcement layer, where the high temperature resistance is provided by the carry cover layer being comprised of a fluoroelastomer. In some cases, the conveyor belt is capable of transporting materials having a temperature in excess of 200 deg C.

The carry cover layer may include an outer surface layer which is comprised of the fluoroelastomer, and an inner layer. The outer surface layer may have a thickness of from about 1 mm to about 4 mm, or even from about 1 mm to about 2 mm thick. The fluoroelastomer may have, in some cases, a fluorine content which is within the range of 64 weight percent to 71 weight percent. Furthermore, the fluoroelastomer in the carry cover layer may be cured with a peroxide curative system. Also, the fluoroelastomer of the carry cover layer may be co-cured with an EPM elastomer, EPDM elastomer, or combination of EPM elastomer of EPDM elastomer based inner layer having a peroxide cure system. In some aspects, material forming the inner layer material includes ethylidene norbornene in any suitable amount, such as, but not limited to an amount of 2% to 7% by weight, or even 2.5% to 6.5% by weight, based on the total amount of material forming the inner layer.

The inner layer may be comprised of an EPM elastomer, an EPDM elastomer, or combination thereof, in some aspects. The EPM elastomer, the EPDM elastomer, or combination thereof may have any suitable viscosity value, such as a minimum Mooney viscosity at 121 deg C. (ASTM D1646, Small Rotor) of less than 25 MU, or even less than 20.5 MU. Further, the EPM elastomer, the EPDM elastomer, or combination thereof based compound should have a cure rate of less than 4 dNm/min (Moving Die Rheometer, 165 deg C., ASTM D5289).

Yet other aspects of the disclosure are methods of manufacturing a conveyor belt, where the methods include providing a reinforcement layer, disposing a carry cover layer above the reinforcement layer, and disposing a pulley cover layer beneath the reinforcement layer. The carry cover layer contains a fluoroelastomer, and the conveyor belt is capable of transporting materials having a temperature in excess of 200° C. The carry cover layer includes an outer surface layer which is comprised of the fluoroelastomer and an inner layer. In some cases, the fluoroelastomer of the carry cover layer is co-cured to an inner layer comprised of an EPM elastomer, an EPDM elastomer, or combination thereof.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
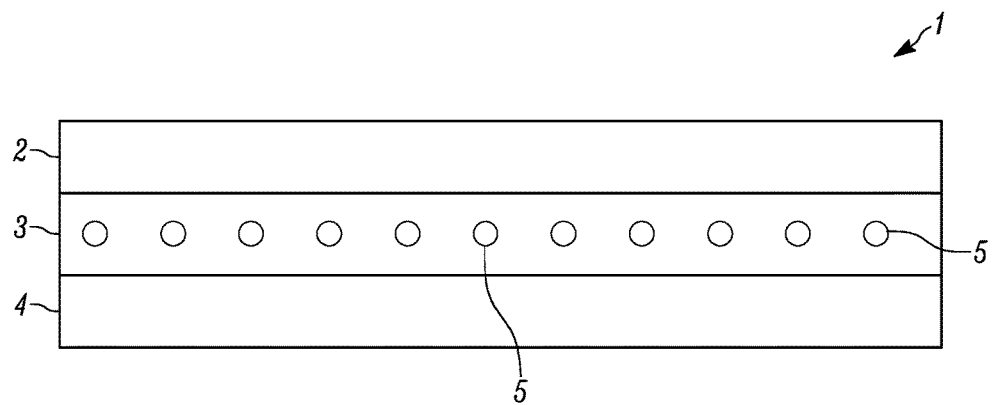
FIG. 1 is a schematic cross-sectional view of a simple conveyor belt of the disclosure which incorporates a fluoroelastomer into the carry cover layer of the conveyor belt.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount or value range listed or described as being useful, suitable, or the like, is intended that any and every concentration or amount or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Some aspects of the disclosure are heavy duty conveyor belts having excellent resistance to high temperatures. These conveyor belts can be repeatedly exposed to temperatures of greater than 200 deg C. or even 250 deg C. without compromising the strength or reliability of the belt while providing a greatly extended service life. The conveyor belts can also be manufactured in a commercially viable and cost effective manner which makes them an attractive improvement over the conventional conveyor belts being used in high temperature applications today.

In some embodiments, conveyor belts include a reinforcement layer, an upper carry cover layer above the reinforcement layer, and a pulley cover layer beneath the reinforcement layer. The carry cover layer contains fluoroelastomer material. In these conveyor belts, the carry cover layer optimally includes an outer surface layer which contains the fluoroelastomer and an inner layer containing an EPM elastomer and/or an EPDM elastomer. The outer surface layer may have any suitable thickness, and in some cases typically from about 1 mm to about 4 mm in thickness, or even from about 1 mm to about 2 mm in thickness. The fluoroelastomer will typically have a fluorine content which is within the range of about 64 weight percent to about 71 weight percent. The fluoroelastomer may typically have repeat units which are comprised of a perfluoroolefin monomer, a perfluorovinyl ether monomer, and a cure site monomer.

Now referencing FIG. 1 illustrating a conveyor belt 1 which includes a carry cover layer 2 which contains fluoroelastomer in accordance with some aspects of the disclosure. This conveyor belt 1 includes an upper carry cover layer a reinforcement layer 3, and pulley cover layer 4. The upper carry cover layer 2 is positioned above the reinforcement layer 3 (which can be constructed of a single ply or multiple plies) with the pulley cover layer 4 being positioned below the reinforcement layer 3. In this fundamental design the reinforcement layer 3 is accordingly situated between the carry cover layer 2 and the pulley cover layer 4.

Figure 2:
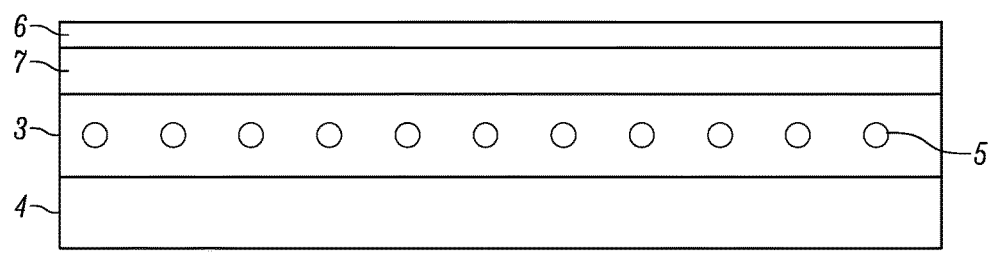
FIG. 2 is a schematic cross-sectional view of a conveyor belt of the disclosure wherein the carry cover layer includes an outer surface layer which is comprised of the fluoroelastomer and an inner layer which is comprised of an EPM elastomer or an EPDM elastomer.
Figure 3:
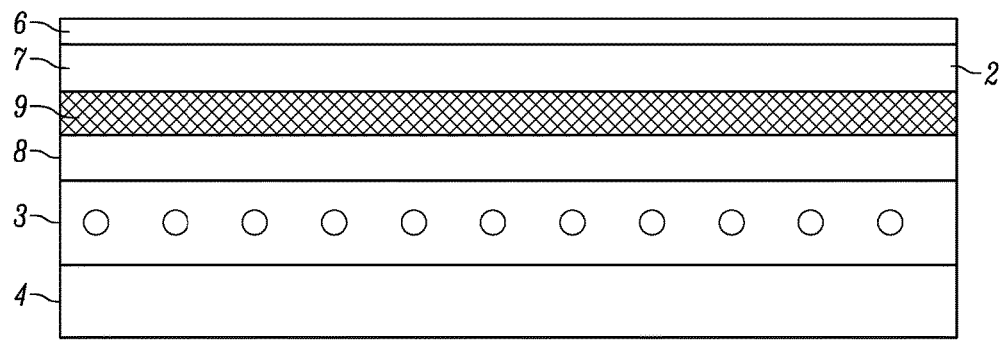
FIG. 3 is a schematic cross-sectional view of a conveyor belt of the disclosure which further includes a basalt layer and a thermal insulation (heat control) layer.
Figure 4:
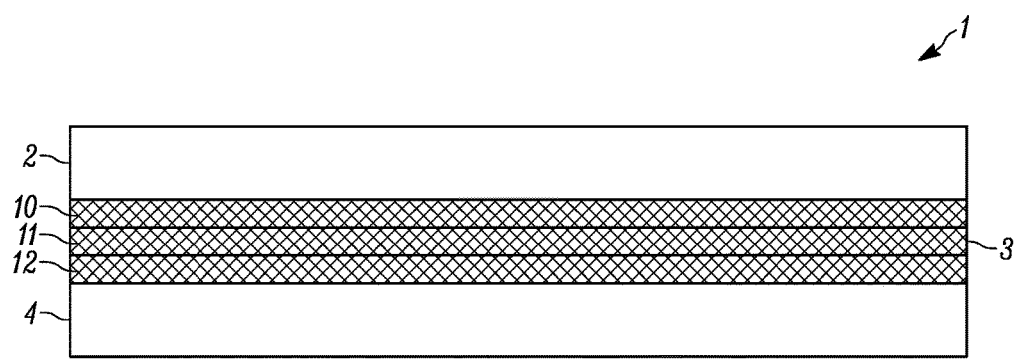
FIG. 4 is a schematic cross-sectional view of a simple conveyor belt of the disclosure which incorporates a fluoroelastomer into the carry cover layer of the conveyor belt and which has a three ply layer of fabric reinforcement.
Figure 5:
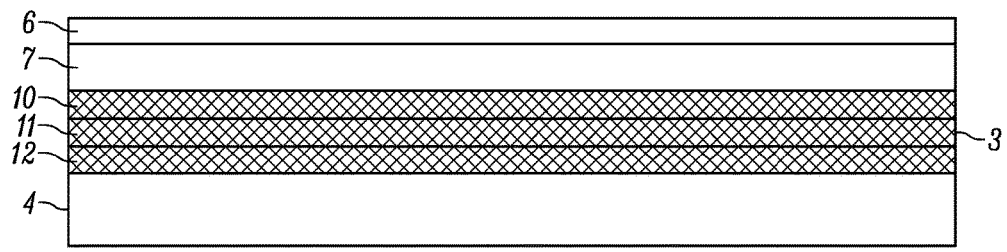
FIG. 5 is a schematic cross-sectional view of a conveyor belt of the disclosure wherein the carry cover layer includes an outer surface layer which is comprised of the fluoroelastomer and an inner layer which is comprised of an EPM elastomer or an EPDM elastomer and which has a three ply layer of fabric reinforcement; and, FIG. 6 is a schematic cross-sectional view of a conveyor belt of the disclosure which further includes a basalt layer and a thermal insulation (heat control) layer and which has a three ply layer of fabric reinforcement.
Figure 6:
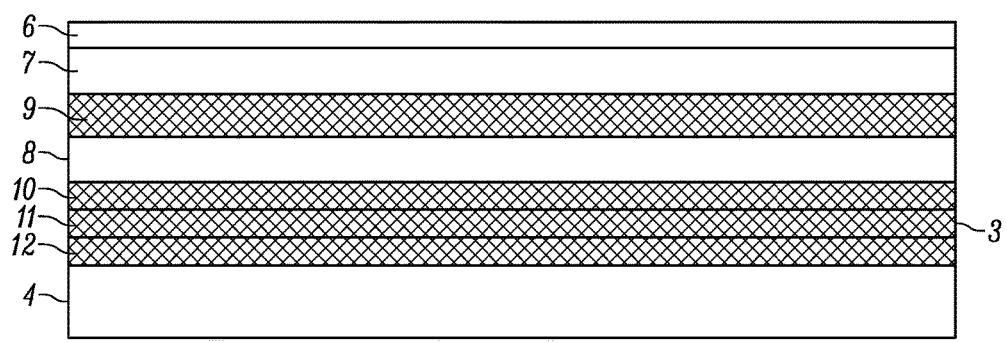

The reinforcement layer 3 and pulley cover layer 4 may be manufactured using materials and methods well known in the art. The reinforcement layer 3 may utilize a plurality of steel cables 5 (one shown) to reinforce the conveyor belt and to provide it with strength and durability, as depicted in FIG. 1 through FIG. 3. The reinforcement layer may as an alternative to or in conjunction with the steel cables utilize fabric or polymer reinforcement components. For instance, the reinforcement layer is more typically constructed of one or more plies of a polymeric fiber as depicted in FIG. 4 through FIG. 6. More specifically, in FIG. 4 through FIG. 6, the reinforcement layer 3 is illustrated as having three plies of fabric reinforcement 10, 11, and 12. The fabric can optionally be formed of materials such as aramid, polyester, or nylon, or any suitable mixture thereof. In such a scenario polyester or nylon may typically be used for economic reasons. For example, polyethylene terephthalate (PET) or polyethylene naphthalate (PEN) can also advantageously be used with polyethylene terephthalate. The nylon fabrics that can be used in some reinforcement layers of conveyor belts of the disclosure may be comprised of virtually any type of nylon, such as nylon-6,6, nylon-6,12, nylon-6,10, nylon-6,9, nylon-6, nylon-11, or nylon-12. For commercial reasons, the nylon may typically be nylon-6,6 or nylon-6.

In one aspect of the disclosure, the reinforcement layer is constructed using three of four plies of a fabric which are comprised of both nylon and polyester cords or yarns. The reinforcement components within the reinforcement layer may typically be embedded in a peroxide cured rubbery polymer, such as, but not limited to, ethylene-propylene-diene monomer elastomer (EPDM), ethylene-propylene elastomer (EPM), or combination thereof.

The pulley cover layer 4 can also be manufactured using materials and methods well known in the art and may include additional strengthening members within the layer. The pulley cover layer 4 will normally be comprised of a rubbery polymer, such as natural rubber, synthetic polyisoprene rubber, styrene-butadiene rubber, polybutadiene rubber, ethylene-propylene-diene monomer rubber, ethylene-propylene rubber, or a blend of two or more of these rubbery polymers. In some cases, the pulley cover layer is comprised of ethylene-propylene-diene monomer rubber, ethylene-propylene rubber, or a blend thereof. The pulley cover layer of the conveyor belts according to the disclosure may be of any suitable thickness, and in some cases, from about 1 mm to about 4 mm, or even from about 1.5 mm to about 2.5 mm in thickness.

The cover carry layer 2 in conveyor belt embodiments of the disclosure is comprised of a fluoroelastomer. The fluoroelastomer may typically have a fluorine content which is within the range of about 64 weight percent to about 71 weight percent, and may frequently have a fluorine content which is within the range of about 67 weight percent to about 70 weight percent. The fluoroelastomer used in the cover carry layer of the conveyor belts of the disclosure may be elastomeric perfluoropolymer which are substantially fully fluorinated fluoropolymers which, when cured, exhibit an elastomeric character. The perfluoroelastomers will typically contain nitrile groups which render them crosslinkable.

Perfluoroelastomers utilized in accordance with the disclosure are polymers having copolymerized units of at least two principal perfluorinated monomers. Generally, one of the principal comonomers is a perfluoroolefin, while the other is a perfluorovinyl ether. Representative perfluorinated olefins include tetrafluoroethylene and hexafluoropropylene. Suitable perfluorinated vinyl ethers are those of the formula:

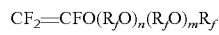

where $R_f$ and $R_f^*$, are different linear or branched perfluoroalkylene groups of 2-6 carbon atoms, wherein m and n are independently integers from 0 to 10, and where $R_f$ is a perfluoroalkyl group containing from 1 to 6 carbon atoms.

In some aspects, perfluoro(alkyl vinyl) ethers includes compositions of the formula:

where X is F or $CF_3$, wherein n is an integer from 0 to 5, and where $R_f$ is a perfluoroalkyl group containing from 1 to 6 carbon atoms.

In some aspects, perfluoro(alkyl vinyl) ethers includes those ethers where n is represents 0 or 1 and wherein $R_f$ contains from 1 to 3 carbon atoms. Examples of such perfluorinated ethers include perfluoro(methyl vinyl) ether and perfluoro(propyl vinyl) ether. Other useful monomers include compounds of the formula:

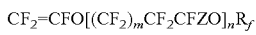

where $R_f$ is a perfluoroalkyl group containing from 1 to 6 carbon atoms, where m represents 0 or 1, n represents an integer from 0 to 5, and where Z represents a fluorine atom or $CF_3$. Some exemplary members of this class are those in which $R_f$ represents a —$C_3F_7$ group, where m represents 0, and where n represents 1.

Additional perfluoro(alkyl vinyl) ether monomers include compounds of the formula:

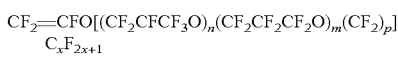

where m and n represent integers from 1 to 10, where p represents an integer from 0 to 3, and where x represents an integer from 1 to 5. Some exemplary members of this class include compounds where n represents 0 or 1, where m represents 0 or 1, and where x represents 1.

Some examples of useful perfluoro(alkoxy vinyl) ethers include those of the structural formula:

where n represents an integer from 1 to 5, where m represents an integer from 1 to 3, and where n is preferably 1. Mixtures of perfluoro(alkyl vinyl) ethers and perfluoro(alkoxy vinyl) ethers may also be used.

Some useful perfluoroelastomers according to the disclosure are composed of tetrafluoroethylene and at least one perfluoro(alkyl vinyl) ether as principal monomer units. In such copolymers, the copolymerized perfluorinated ether units constitute from about 15 to about 50 mole percent of total monomer units in the polymer.

In some aspects, the perfluoropolymer further contains repeat units which are comprised of at least one cure site monomer to make the fluoroelastomer curable with peroxide curing agents. This may provide good adhesion between the layer of fluoroelastomer in the conveyor belt and adjacent layer of EPDM elastomer and/or EPM elastomer. For instance, this may be useful in cases where the carry cover layer is comprised of an outer layer of the fluoroelastomer and an inner layer of an EPDM elastomer and/or EPM elastomer. This may also be useful in cases where the fluoroelastomer carry cover layer is adhered directly onto the reinforcement layer or another intermediate layer within the conveyor belt. In such systems the fluoroelastomer is co-cured with the EPDM elastomer and/or EPM elastomer utilizing a peroxide curative system. Thus, in some instances, the fluoroelastomer is to be peroxide curable rather than curable with a bisphenol curative system.

In some aspects where the fluoroelastomer of the carry cover layer is cured with a peroxide curative system, the carry cover layer includes an outer surface layer which is comprised of the fluoroelastomer and an inner layer. The inner layer may be formed of composition having an elastomer material containing ethylidene norbornene (ENB) in any suitable amount. In some cases, the amount of ethylidene norbornene is from about 2% to about 7% by weight based on the elastomer material, or even from about 2.5% to about 6.5% by weight based on the elastomer material. In some cases, the polymer material is an EPM elastomer and/or an EPDM elastomer, which contains such suitable amounts of ethylidene norbornene. While not bound to any particular theory of operation, inclusion of ethylidene norbornene in the elastomer material used in compositions forming the inner layer may be a factor in promoting adhesion between the inner layer and the fluoroelastomer contained in the cover layer. Some useful EPDM elastomers which contain ethylidene norbornene include those of the following general structural formula:

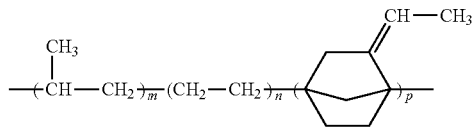

where m and n are the respective propylene and ethylene amounts, and p is the ethylidene norbornene (ENB) amount.

In some aspects of the disclosure, where the elastomer material used in compositions forming an inner later is an EPM elastomer and/or an EPDM elastomer, such EPM elastomer and/or EPDM elastomer may have a minimum Mooney viscosity at 121 deg C. (small rotor) of less than 25 MU, or even less than 20.5 MU. Also, the EPM elastomer and/or the EPDM elastomer based compounds should have a cure rate of less than 4 dNm/min (Moving Die Rheometer, 165 deg C., ASTM D5289). Some useful examples of such elastomers include, but are not limited to, Keltan® 2470 (4.2% ENB) and Keltan® 2750 (7.8% ENB), available from Arlanxeo, Vistalon® 2502 (4.2% ENB) available from Exxon Mobile, or Royalene® 580HT (2.7% ENB), available from Lion Elastomers.

The peroxide curing agents which may be used in the practice of the disclosure are those which are generally suitable for curing EPDM elastomer and/or EPM elastomer. Some representative examples of organic peroxides which can be used include, but not limited to, dicumyl peroxide, bis-(t-butyl peroxy-diisopropyl benzene, t-butyl perbenzoate, di-t-butyl peroxide, 2,5-dimethyl-2,5-di-t-butylperoxyhexane, alpha-alpha-bis(t-butylperoxy) diisopropylbenzene, methylethyl ketone peroxide, cyclohexanone peroxide, cumene hydroperoxide, pinane hydroperoxide, p-menthane hydroperoxide, t-butyl hydroperoxide, di-t-butyl peroxide, and the like. Dicumyl peroxide and di-t-butyl peroxide may typically be the peroxide compounds. In any case, the peroxide crosslinking agent will typically be supported on an inert powdered carrier, such as silica, clay or calcium carbonate. The peroxide will typically be present on the powdered carrier at a level which is within the range of about 40 weight percent to about 70 weight percent, or even at a level in the range of about 50 weight percent to 60 weight percent, based upon the total weight of the peroxide and the carrier.

The fluoroelastomer will preferable further contains copolymerized units of at least one cure site monomer, generally in amounts of from 0.1 weight percent to 5 weight percent to make the fluoroelastomer peroxide curable so that it can be co-cured with EPDM elastomer and/or EPM elastomer. The cure site monomer will preferably be included at a level with is within the range of 0.3 weight percent to 1.5 weight percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Some useful nitrile-containing cure site monomers include those of the following structural formulas:

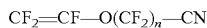

where n represents an integer from 2 to 12 and which is preferably an integer from 2 to 6;

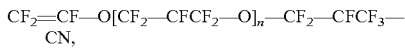

where n represents an integer from 0 to 4 and which is preferably an integer from 0 to 2;

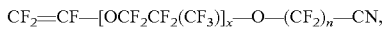

where x represents an integer from 1 to 2 and wherein n represents an integer from 1 to 4; and

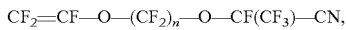

where n represents an integer from 2 to 4.

In some aspects, the cure site monomers are perfluorinated polyethers having a nitrile group and a trifluorovinyl ether group. For example, the cure site monomer may be perfluoro(8-cyano-5-methyl-3,6-dioxa-1-octene) or 8-CNVE. A detailed description of such fluoroelastomers and cure site monomers which can be utilized in the synthesis curable fluoroelastomers is provided in U.S. Pat. No. 6,191,208. The teachings of U.S. Pat. No. 6,191,208 are incorporated herein for the purpose of disclosing fluoroelastomers which can be utilized in the practice of this disclosure. Other cure site monomers such as those described in U.S. Pat. Nos. 4,281,092 and 5,789,509 can also be utilized in the fluoroelastomers employed in the conveyor belts of this disclosure. The teachings of U.S. Pat. Nos. 4,281,092 and 5,789,509 are incorporated herein by reference for the purpose of describing such cure site monomers.

Brominated α-olefins and iodinated α-olefins in which at least one hydrogen atom has been replaced with a bromine atom or an iodine atom, respectively, and optionally, one or more of the remaining hydrogen atoms have been replaced with an atom of another halogen, such as fluorine, can be also be utilized as the cure site monomer in making peroxide curable fluoroelastomers useful according to the disclosure. Some compounds of this type are available commercially and others can be prepared by methods known in the art, for example, as shown by Tarrant and Tandon, J. Org. Chem. 34, 864 (1969) and by Fainberg and Miller, 79 JACS 4170 (1957) and J. Org. Chem. 42 1985-90 (1977).

Some representative bromine-containing olefins which are copolymerizable with the monomers used to form the fluoroelastomers of the disclosure include bromotrifluoroethylene, 1-bromo-2,2-difluoroethylene, 4-bromo-3,3,4,4-tetrafluorobutene-1, vinyl bromide, 1-bromo-1,2,2-trifluoroethylene, perfluoroallyl bromide, 4-bromo-1,1,2-trifluorobutene, 4-bromo-1,1,3,3,4,4-hexafluorobutene, 4-bromo-3-chloro-1,1,3,4,4-pentafluorobutene, 6-bromo-5,5,6,6-tetrafluoro-hexene, 4-bromo-perfluorobutene-1, and 3,3-difluoroallylbromide. In some cases, sufficient units of the brominated olefin are used to provide at least 0.05 weight percent bromine, usually about 0.3-1.5 weight percent bromine, in the fluoroelastomer. The fluoroelastomers contain up to 3 mole percent, based on the total moles of the fluoroelastomer, of units derived from the bromine-containing olefin, usually at least about 0.2 mole percent. Bromine-containing olefins used in the disclosure are further described in U.S. Pat. No. 4,214,060, which is incorporated herein by reference.

Representative iodine-containing olefins in amounts up to 3 mole percent which are copolymerizable with the monomers used to form the fluoroelastomers of this invention include compounds of the formula:

where x is 2-6.

Some examples of these iodine-containing olefins include, but are not limited to, iodoethylene, 3-chloro-4-iodo-3,4,4-trifluorobutene, 2-iodo-1,1,2,2-tetrafluoro-1-(vinyloxy)ethane, 2-iodo-1-(perfluorovinyloxy)-1,1,-2,2-tetrafluoroethylene, 1,1,2,3,3,3-hexafluoro-2-iodo-1-(perfluorovinyloxy)propane, 2-iodoethyl vinyl ether, 3,3,4,5,5,5-hexafluoro-4-iodopentene, iodotrifluoroethylene, and 4-iodo-3,3,4,4-tetrafluorobutene-1.

Some brominated α-olefins and iodinated α-olefins which can be utilized as the cure site monomer in making peroxide curable fluoroelastomers in accordance with this disclosure are described in greater detail in U.S. Pat. No. 4,694,045. The teachings of U.S. Pat. No. 4,694,045 are incorporated by reference herein for the purpose of describing such fluoroelastomers.

In some aspects of this disclosure, as illustrated in FIG. 2, the carry cover layer includes an outer surface layer 6 which is comprised of the fluoroelastomer and an inner layer 7 which is comprised of an EPM elastomer and/or an EPDM elastomer. The outer surface layer is typically from about 0.5 mm to about 4 mm in thickness, or even from about 1 mm to about 2 mm in thickness. The carry cover layer will typically have a total thickness of from about 4 mm to about 10 mm, or even from about 5 mm to about 7 mm in thickness.

In another aspect of the disclosure, as illustrated in FIG. 3, the conveyor belt can also include a basalt fiber layer or a fiberglass layer, and a thermal insulation layer to provide an even higher level of resistance to high temperatures. In this aspect, the carry cover layer 2 includes an outer surface layer 6 which is comprised of the fluoroelastomer and an inner layer 7 which is comprised of an EPM elastomer and/or an EPDM elastomer. A basalt fiber layer or a fiberglass layer 9 is situated beneath the cover carry layer 2 and above a thermal insulation layer 8. The basalt fiber is an extremely fine fiber which is comprised of plagioclase, pyroxene, and olivine.

The thermal insulation layer 8 may be comprised of a rubbery polymer composition which has a low level of thermal conductivity with the reinforcement layer 3 being situated beneath the thermal insulation layer 8 and above the pulley cover layer 4. In one aspect of the disclosure, the thermal insulation layer 8 is comprised of an ethylene-propylene-alkylidene norbornene terpolymer rubber which contains a chlorinated, cyclic aliphatic hydrocarbon resin. For instance, the thermal insulation layer 8 can be a blend of Nordel® 4520 EPDM elastomer or Nordel® 4640 EPDM elastomer with Dechlorane® Plus 515 chlorinated, cyclic aliphatic hydrocarbon resin. In another aspect of the disclosure, the thermal insulation layer can be comprised of an EPDM elastomer containing glass, aramid, or carbon fibers and optionally an inorganic or organic flame retardant, such as a chlorinated hydrocarbon. The glass, aramid, polyamide, or carbon fibers used in such thermal insulation layers are typically chopped fibers which are from 0.1 mm to 0.5 mm long and preferably from 0.2 mm to 0.4 mm in length. The rubber in the thermal insulation layer can also optionally be comprised of ammonium sulfate, antimony oxide and/or hydrated alumina. In still another aspect of the disclosure, the thermal insulation layer 8 can be comprised of a maleic anhydride modified EPDM elastomer which contains glass, aramid, polyamide, or carbon fibers. The thermal insulation material used in the thermal insulation layer can also optionally be blown to further reduce thermal conductivity.

EXAMPLES

The following experimental data was generated for the purpose of further illustrating the nature of some of the embodiments and aspects of the disclosure, and are not intended as a limitation on the scope thereof.

In the following examples, in preparing elastomeric compositions used for forming an inner layer of a carry cover layer, in a first pass, a non-productive blend of components was mixed in an internal mixer as indicated in the tables. The non-productive blend was dropped at a temperature of from about 138 deg C. to about 165 deg C. Thereafter, in a second pass, additional 'productive blend components' were added to non-productive blend to form a final productive blend by mixing in an internal mixer. The productive blend was dropped at a temperature of from about 99 deg C. to about 110 deg C. Ingredients used for these examples, Ex. 1 through Ex. 6, are provided in Table 1.

TABLE 1

| Ingredients | Ex. 1 | Ex. 2 | Ex. 3 | Ex. 4 | Ex. 5 | Ex. 6 |
| --- | --- | --- | --- | --- | --- | --- |
| Non-productive Blend | | | | | | |
| Keltan ® 2470 (4.2% ENB) | 0 | 0 | 100 | 20 | 0 | 0 |
| Keltan ® 2750 (7.8% ENB) | 0 | 0 | 0 | 0 | 75 | 0 |
| Vistalon ™ 2502 (4.2% ENB) | 75 | 100 | 0 | 0 | 0 | 0 |
| Royalene ® 580HT (2.7% ENB) | 25 | 0 | 0 | 70 | 0 | 100 |
| Keltan ® 0500R | 0 | 0 | 0 | 10 | 25 | 0 |
| N330 Carbon Black | 35 | 0 | 0 | 0 | 0 | 0 |
| N550 Carbon Black | 0 | 35 | 0 | 30 | 30 | 30 |
| N762 Carbon Black | 0 | 0 | 30 | 0 | 0 | 0 |
| Silica | 10 | 10 | 30 | 15 | 15 | 30 |
| Calcium Carbonate | 0 | 0 | 50 | 0 | 15 | 10 |
| Paraffinic oil | 0 | 0 | 45 | 10 | 10 | 35 |
| Zinc Oxide | 10 | 10 | 10 | 10 | 10 | 10 |
| Stearic acid | 1 | 1 | 1 | 1 | 1 | 1 |
| Struktol ® TS 35 DL | 0 | 0 | 3 | 3 | 0 | 3 |
| Oxoflex ® DPA | 1.67 | 1.67 | 2 | 0 | 0 | 0 |
| ZMTI | 3.33 | 3.33 | 3.5 | 0 | 0 | 0 |
| MTI | 0 | 0 | 0 | 0 | 0.5 | 0 |
| Naugard ® 445 | 0 | 0 | 0 | 0 | 2 | 0 |
| Wingtack ® 95 tackifier resin | 0 | 5 | 0 | 0 | 0 | 0 |
| SI Group SP-1068, tackifier resin | 5 | 0 | 0 | 0 | 0 | 0 |
| Dow Carbowax ™ PEG 4000 | 0 | 0 | 0 | 0 | 2.5 | 0 |
| Novares TD ® 100 | 0 | 0 | 0 | 0 | 4 | 0 |
| Productive Blend Components | | | | | | |
| VUL-CUP ® 40KE | 0 | 0 | 7.8 | 6 | 6 | 6 |
| Rhenocure ® EF(DBDB)-60 | 4.5 | 4.5 | 0 | 0 | 0 | 0 |
| TMPTMA (40% active) | 2.75 | 2.75 | 0 | 0 | 2.8 | 0 |
| Rhenofit EDMA/S | 0 | 0 | 3.25 | 2.5 | 0 | 2.5 |
| HMMM (72% active) | 0 | 0 | 1.56 | 1.56 | 0 | 1.56 |
| Resorcinol (80% active) | 0 | 0 | 3.75 | 3.75 | 0 | 3.75 |
| PHR Running Total: | 173.25 | 173.25 | 290.86 | 182.81 | 198.8 | 232.81 |
| Average ENB of elastomer, % | 3.8 | 4.2 | 4.2 | 2.7 | 5.8 | 2.7 |

The productive blends were then formed into 2 mm thick sheets, and cured at temperature of about 165 deg C. for 30 minutes. Physical property testing was conducted on the cured example sheets or uncured examples, with values indicated in Table 2 below. Mooney scorch was conducted on a Mooney viscometer (small rotor) for uncured examples, and Rheometer tests conducted using a moving die rheometer for uncured examples. Tensile strength, elongation and Shore A Hardness were performed on cured example sheets according to ASTM D412.

TABLE 2

| Evaluation | Ex. 1 | Ex. 2 | Ex. 3 | Ex. 4 | Ex. 5 | Ex. 6 |
| --- | --- | --- | --- | --- | --- | --- |
| Specific Gravity: | 1.0982 | 1.0973 | 1.2296 | 1.0953 | 1.1493 | 1.1293 |
| Mooney Scorch (Small rotor, 30 min/121 deg C., ASTM D1646) | | | | | | |
| ML | 22.3 | 15.6 | 10.4 | 21.3 | 11.6 | 20.5 |
| t5 | | | | 21.95 | | |
| Moving Die Rheometer (30 min/165 deg C., ASTM D5289) | | | | | | |
| Min | 2.443 | 1.67 | 1.245 | 2.288 | 1.006 | 2.295 |
| Max | 16.51 | 34.62 | 20.12 | 33.63 | 22.21 | 22.29 |

TABLE 2-continued

| Evaluation | Ex. 1 | Ex. 2 | Ex. 3 | Ex. 4 | Ex. 5 | Ex. 6 |
|---|---|---|---|---|---|---|
| Tris1 | 1.19 | 0.69 | 1.66 | 0.82 | 0.94 | 1.09 |
| T25 | 4.27 | 3.25 | 4.46 | 3.23 | 3.18 | 3.45 |
| S25 | 5.959 | 9.909 | 5.963 | 10.11 | 6.301 | 7.293 |
| T90 | 23.06 | 21.73 | 17.86 | 16.67 | 20.67 | 15.35 |
| S90 | 15.1 | 31.31 | 18.23 | 30.5 | 20.09 | 20.29 |
| Rate | 1.49 | 3.41 | 1.83 | 4.72 | 2.45 | 2.18 |
| Amount | 14.06 | 32.95 | 18.87 | 31.34 | 21.2 | 19.99 |
| Original Physical Properties | | | | | | |
| Tensile, MPa | 7.7 | 12.5 | 8.2 | 13.0 | 10.0 | 10.5 |
| Elongation, % | 901 | 485 | 697 | 557 | 595 | 725 |
| Mod 100, MPa | 1.2 | 1.9 | 1.3 | 2.0 | 1.4 | 1.4 |
| Shore A Hardness | 59 | 61 | 60 | 64 | 57 | 57 |

Uncured productives of each of Examples 1 though 6 were individually applied to a 2 mm thick FKM fluoroelastomer based compound substrate. The substrate and productive was blends where then cured at a temperature of 165 deg C. for 30 minutes, and then cut into test specimens, each 25.4 mm wide. Adhesive/cohesive properties were evaluated using a peel test at ambient temperature.

TABLE 3

| Evaluation | Ex. 1 | Ex. 2 | Ex. 3 | Ex. 4 | Ex. 5 | Ex. 6 |
|---|---|---|---|---|---|---|
| Adhesion to FKM | | | | | | |
| Value, N/mm | 7.5 | 12.1 | 14.8 | 5.3 | 15.1 | 16.4 |
| Failure Mode | Adhesive | Cohesive | Cohesive | Adhesive | Cohesive | Cohesive |
| Heat Aged Adhesion to FKM (120 h/177 deg C.) | | | | | | |
| Value, N/mm | — | 5.7 | 10.3 | — | 10.4 | 12.7 |
| Failure Mode | — | Cohesive | Cohesive | — | Cohesive | Cohesiev |
| Heat Aged Adhesion to FKM (120 h/204 deg C.) | | | | | | |
| Value, N/mm | — | 4.9 | 4.9 | — | 7.7 | 9.8 |
| Failure Mode | — | Cohesive | Cohesive | — | Cohesive | Cohesive |

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE

1 Conveyor belt
2 Carry cover layer
3 Reinforcement layer
4 Pulley cover layer
5 Steel cable
6 outer surface layer
7 inner layer
8 Thermal insulation layer
9 Fiberglass layer
10 Fabric reinforcement
11 Fabric reinforcement
12 Fabric reinforcement

What is claimed is:

1. A conveyor belt comprising a reinforcement layer, a carry cover layer above the reinforcement layer, and a pulley cover layer beneath the reinforcement layer, wherein the carry cover layer is comprised of a fluoroelastomer;
   wherein the fluoroelastomer has a fluorine content which is within the range of 64 weight percent to 71 weight percent; and,
   wherein the fluoroelastomer has repeat units which are comprised of at least two perfluorinated monomers and at least one cure site monomer.

2. The conveyor belt as specified in claim 1 wherein the carry cover layer comprises an outer surface layer which is comprised of the fluoroelastomer, and an inner layer which is comprised of an EPM elastomer or an EPDM elastomer.

3. The conveyor belt as specified in claim 2 wherein the outer surface layer is from 0.5 mm to 4 mm thick.

4. The conveyor belt as specified in claim 2 wherein the outer surface layer is from 1 mm to 2 mm thick.

5. The conveyor belt as specified in claim 1 wherein the fluoroelastomer has repeat units which are comprised of a perfluoroolefin monomer, a perfluorovinyl ether monomer, and a cure site monomer.

6. The conveyor belt as specified in claim 5 wherein the perfluoroolefin monomer is selected from the group consisting of vinylidene fluoride, hexafluoropropylene, and tetrafluoroethylene.

7. The conveyor belt as specified in claim 6 wherein the perfluorovinyl ether monomer is selected from the group consisting of perfluoro(methyl vinyl) ether and perfluoro (propyl vinyl) ether repeat units.

8. The conveyor belt as specified in claim 7 wherein the cure site monomer is selected from the group consisting of nitrile-containing fluorinated olefin monomers, nitrile-containing fluorinated vinyl ether monomers, fluorinated olefin monomers, brominated α-olefin monomers, and iodinated α-olefin monomers.

9. The conveyor belt as specified in claim 5 wherein the perfluoroolefin monomer is present in the fluoroelastomer at a level which is within the range of 20 weight percent to 80 weight percent, wherein the perfluorovinyl ether monomer is present in the fluoroelastomer at a level which is within the range of 20 weight percent to 80 weight percent, and wherein the cure site monomer is present in the fluoroelastomer at a level which is within the range of 0.1 weight percent to 5 weight percent.

10. The conveyor belt as specified in claim 9 wherein the cure site monomer is present in the fluoroelastomer at a level which is within the range of 0.2 weight percent to 2 weight percent.

11. The conveyor belt as specified in claim 9 wherein the cure site monomer is present in the fluoroelastomer at a level which is within the range of 0.3 weight percent to 1 weight percent.

12. A conveyor belt comprising a reinforcement layer, a carry cover layer disposed above the reinforcement layer, and a pulley cover layer disposed beneath the reinforcement layer, wherein the carry cover layer comprises a fluoroelastomer, and wherein the conveyor belt can transport materials having a temperature in excess of 200° C.;
wherein the fluoroelastomer has a fluorine content which is within the range of 64 weight percent to 71 weight percent; and,
wherein the fluoroelastomer has repeat units which are comprised of at least two perfluorinated monomers and at least one cure site monomer.

13. The conveyor belt as specified in claim 12 wherein the carry cover layer comprises an outer surface layer which is comprised of the fluoroelastomer, and an inner layer.

14. The conveyor belt as specified in claim 13 wherein the outer surface layer is from 1 mm to 4 mm thick.

15. The conveyor belt as specified in claim 12 wherein the fluoroelastomer has a fluorine content which is within the range of 64 weight percent to 71 weight percent.

16. The conveyor belt as specified in claim 12 wherein the fluoroelastomer of the carry cover layer is cured with a peroxide curative system.

17. The conveyor belt as specified in claim 12 wherein the fluoroelastomer of the carry cover layer is co-cured to an inner layer which is comprised of an EPM elastomer, an EPDM elastomer, or combination thereof.

18. The conveyor belt as specified in claim 13 wherein the inner layer comprises an EPM elastomer, an EPDM elastomer or combination thereof, and wherein the EPM elastomer, the EPDM elastomer or the combination thereof comprise ethylidene norbornene in an amount of 2% to 7% by weight.

19. The conveyor belt as specified in claim 17 wherein the EPM elastomer, the EPDM elastomer or the combination thereof comprises ethylidene norbornene in an amount of 2% to 7% by weight.

20. The conveyor belt as specified in claim 17 wherein the inner layer is formed of the EPM elastomer, the EPDM elastomer or the combination thereof, having a minimum Mooney viscosity at 121 deg C. (small rotor) of less than 20.5 MU.

21. The conveyor belt as specified in claim 17 wherein the EPM elastomer, the EPDM elastomer or the combination thereof has a cure rate of less than 4 dNm/min (Moving Die Rheometer, 165 deg C., ASTM D5289).

22. The conveyor belt as specified in claim 17 wherein the inner layer comprises silica at a level of from 10 phr to 50 phr.

23. The conveyor belt as specified in claim 17 wherein the inner layer comprises oil at a level of from 0 phr to 50 phr.

24. A method of manufacturing a conveyor belt, the method comprising:
providing a reinforcement layer;
disposing a pulley cover layer beneath the reinforcement layer; and,
disposing a carry cover layer above the reinforcement layer;
wherein the carry cover layer comprises an outer surface layer which is comprised of the fluoroelastomer, and an inner layer, and wherein the conveyor belt can transport materials having a temperature in excess of 200° C.;
wherein the fluoroelastomer has a fluorine content which is within the range of 64 weight percent to 71 weight percent; and,
wherein the fluoroelastomer has repeat units which are comprised of at least two perfluorinated monomers and at least one cure site monomer.

* * * * *